Oct. 6, 1942.  J. W. LEIGHTON  2,297,901
INDIVIDUAL WHEEL SUSPENSION
Filed Aug. 1, 1940  2 Sheets-Sheet 2
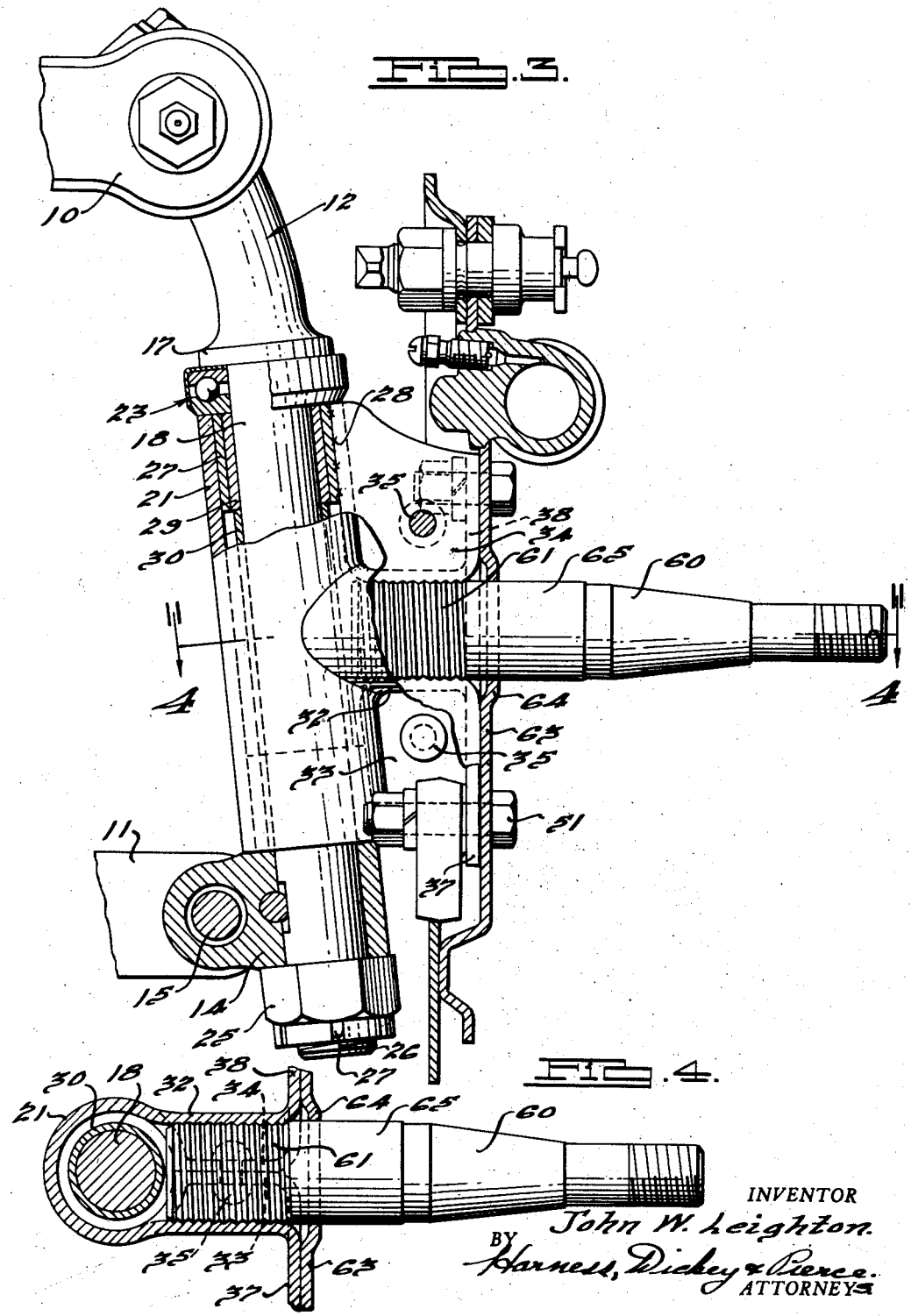
INVENTOR
John W. Leighton.
BY Harness, Dickey & Pierce.
ATTORNEYS Patented Oct. 6, 1942

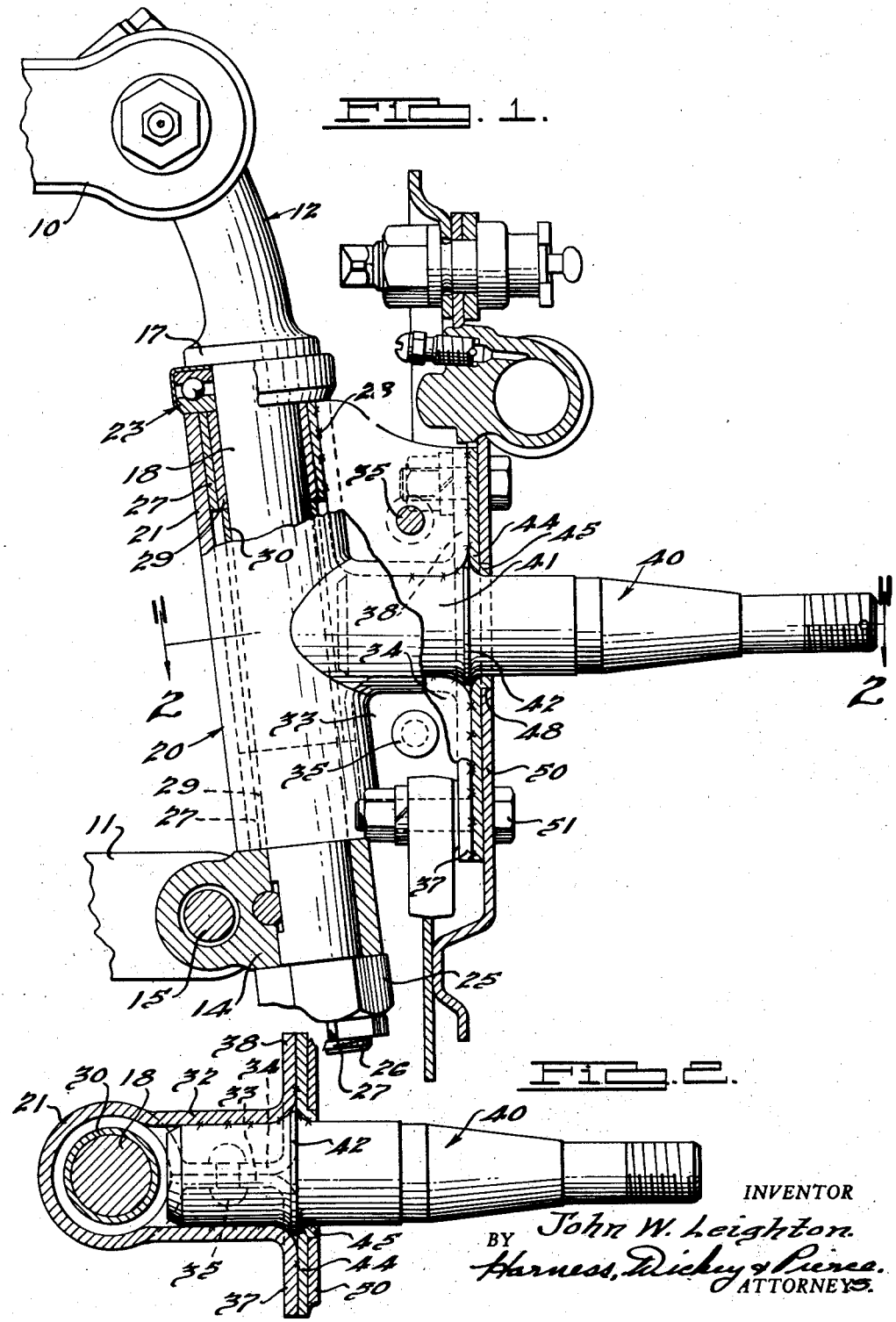

2,297,901

UNITED STATES PATENT OFFICE 2,297,901

INDIVIDUAL WHEEL SUSPENSION

John W. Leighton, Port Huron, Mich.

Application August 1, 1940, Serial No. 349,095

17 Claims. (Cl. 280—93)

The invention relates generally to motor vehicles and it has particular relation to individual wheel springing for supporting and connecting the front end of the vehicle on the front wheels.

The use of individual wheel springing at the front end of vehicles is well known and at the present time the structure generally employed includes upper and lower links pivotally connected at their inner ends to the vehicle frame and at their outer ends to a wheel mounting arrangement which includes a spindle upon which the wheel is rotatably mounted. Due to the fact that the front wheels are employed for steering the vehicle, it is necessary that each wheel be turnable about a generally vertical axis and ordinarily the structure employed for obtaining this result includes a kingpin and knuckle bracket of the kind used for many years on cross type axles.

One object of the present invention is to provide an improved wheel mounting including a spindle and bracket for turnably mounting the wheel for steering purposes, wherein the improved structure can be manufactured at a much lower cost and by means of simpler manufacturing operations.

Another object of the invention is to provide a spindle and bracket arrangement which enables manufacturing the bracket and spindle separately by simple manufacturing operations and then subsequently rigidly associating these parts into a unitary article.

And, in general, it is an object of the invention to provide an improved individual wheel springing which can be manufactured at a lower cost and in a more simplified manner, all to the end that the overall cost of the vehicle will be reduced, while still providing a durable and efficient wheel mounting.

Other objects of the invention will become apparent from the following specification, from the drawings relating thereto, and from the claims hereinafter set forth.

For a better understanding of the invention, reference may be had to the drawings, wherein:

Figure 1 is a fragmentary elevational view, partly in cross section, of an individual wheel springing constructed according to one form of the invention;

Fig. 2 is a cross-sectional view taken substantially along the line 2—2 of Fig. 1;

Fig. 3 is an elevational view, partly in cross section, of a wheel springing constructed according to another form of the invention; and Fig. 4 is a cross-sectional view taken substantially along the line 4—4 of Fig. 3.

Referring to Fig. 1, it may be mentioned initially that the wheel springing includes upper and lower arms 10 and 11, of which only the outer ends are shown, that the inner ends of these arms are pivotally connected to the vehicle frame at vertically spaced points and that between one of the arms and the vehicle frame a supporting and cushioning spring is provided for resiliently anchoring the vehicle frame on such arm. The outer ends of the arms 10 and 11 are pivotally connected to an upright kingpin or wheel supporting member 12 and the pivotal connections are such that pivotal movement occurs about substantially horizontal axes directed longitudinally of the vehicle. The pivotal connection at the upper end of the member 12 may be generally of the type disclosed in Patent No. 2,188,952, wherein the upper end of the member is bifurcated and is clamped by means of a clamping bolt, around a pin connected to the upper arm. The lower end of the member 12 extends through a block 14 mounted on a pin 15 connected to the lower arm 11 and the connection at this point generally may correspond to that disclosed in my Patent No. 2,123,087.

Now referring in particular to the member 12, it will be noted that such member adjacent its upper end is provided with an upset shoulder 17 and that below this shoulder 17, the member is of smaller, cylindrical character as indicated at 18. On this cylindrical portion 18 a bracket 20 is turnably mounted and the latter has a cylindrical portion 21 receiving the cylindrical portion 18. For taking thrust load at the upper end of the bracket, a ball bearing 23 is provided between the shoulder 17 and the upper end of the portion 21 of the bracket. The lower end of the portion 21 of the bracket has a turning fit with the block 14 and the position of the block on the pin may be adjustably determined by a nut 25 threaded on the smaller threaded lower end 26 of the pin and a cotter pin lock as will be readily understood.

Within opposite ends of the cylindrical portion 21 of the bracket, cylindrical shells 27 are disposed and these may be surface copper welded in place as generally indicated at 28. Within each of the shells 27, a cylindrical bearing bushing 29 is disposed and this bushing has a close fit in the shell and a working or running fit with the cylindrical portion 18 of the pin. Such bushings 29 are held in spaced relation on the pin by means of a sleeve 30. Lubricant may be supplied to the ball bearings 23 and to the bearing bushings 29 in any suitable manner and grease fittings may be provided at desired points for securing such lubrication.

The bracket 20 is constructed from sheet metal and the cylindrical portion 21 is formed by cylindrically folding the sheet at its center. Outward of the cylindrical portion 21, the legs of the sheet metal are formed to provide a second tubular portion 32 extending crosswise to the cylindrical or tubular portion 21 and above and below the tubular portion 32, the legs are brought into contacting relation, as indicated at 33 and 34, and are riveted as indicated at 35. It may be observed at this time that the contacting legs 33 and 34 provide strong web structures interconnecting the two tubular portions 21 and 32 and that these reinforcing webs strongly resist deformation of either tubular portion. The outer ends of the legs of the sheet metal are turned to provide attaching flanges 37 and 38 which are apertured to receive fastening bolts to be mentioned presently.

The tubular portion 32 receives the inner end of a spindle 40 having an outer conventional formation for rotatably receiving a front vehicle wheel. The inner end of the spindle is cylindrical as indicated at 41 and fits within the tubular portion 32 of the bracket and an upset shoulder 42 on the spindle abuts the outer end of the tubular portion. A sheet metal plate 44 is apertured for receiving the spindle and at the edge of the aperture the metal is flanged outwardly as indicated at 45 and this flange portion is adapted to abut the outer side of the shoulder 42 on the spindle. It will be observed that opposite sides of the shoulder are concave in character and that the surface at the ends of the tubular portion and the surface on the flanged-out portion 45 of the plate 44 are rounded to fit the rounded sides of the shoulder 42 so as to provide a strong relation of parts and to insure strength of sheet metal as well as shoulder. The flanged-out part 45 of the plate 44 has an external cylindrical shoulder 48 which locates a brake mounting or backing plate 50 adapted to be secured to the bracket. The openings in the flanges 37 and 38 of the bracket are aligned with similar openings in the plate 44 and the brake mounting or backing plate 50 is secured to these parts by means of fastening bolts 51. Thus, it will be seen that the brake mounting plate may be removed by removing the fastening bolts.

The spindle, bracket, and plate 44 are positively connected by copper surface welding and the same welding process may be used for welding the shells 27 in place. In this welding process, molten copper flows in an inert atmosphere between the surface of the inner end 41 of the spindle and the tubular portion 32 of the bracket, between the shoulder 42 on the spindle and the adjacent surfaces of the plate 44 and the end of the tubular portion 32, and between the flanges 37 and 38 and the plate 44. From this it follows that the spindle is positively welded in place by a strong copper weld, that the plate 44 is welded to the flanges 37 and 38, and that the inner edge portion of the plate, the outer end of the tubular portion 32, and the shoulder 42 on the spindle provide a strong locating as well as a reinforced junction. Loads are thus strongly supported and any tendency of the bracket to bend or deform with respect to the spindle, especially at the outer end of the tubular portion 32, is strongly resisted. It may be added at this point that the web formed by the upper and lower portions 33 and 34 of the legs of the bracket add to this strength of structure so that finally a rigidly strong structure is provided adapted to take strong shocks and strong loads occurring during operation of the vehicle.

From the foregoing it will be appreciated that the bracket may be constructed inexpensively from sheet metal and may be fabricated and formed by simple manufacturing operations. The bearing bushings and shells in the tubular portion 21 of the bracket can be constructed inexpensively and may be located in place by simple operations. The construction of the spindle is simplified since it can be manufactured from bar stock and the shoulder 42 can be inexpensively formed by metal upsetting operations such as by electrically heating the bar in the vicinity of the shoulder and axially upsetting the metal.

Now, referring to Figures 3 and 4, a different form of the invention is therein disclosed, wherein a spindle 60 of somewhat different character is provided. This spindle does not have the shoulder 42 provided in the spindle 40 but instead has an inner end provided with external threads 61 which are of shallow or obtuse angle character. Likewise, the tubular portion 32 has internal threads for receiving the threaded portion 61. When assembled, the contacting thread surfaces are copper welded in the manner previously mentioned. In this construction the plate 44 is omitted and a brake backing or mounting plate 63 is used which has a central portion laterally offset from the plane of the plate as indicated at 64 and an aperture in such offset portion which approximately fits a cylindrical portion 65 of the spindle. This provides additional support for the spindle in spaced relation to the welded connection.

Either form of the invention provides a rigid and sturdy bracket and spindle combination, which may be quickly assembled with the kingpin member 12 and so related to the latter that the wheel or spindle may be turned easily during steering while still obtaining the strength and rigidity of parts required. The bracket being constructed of sheet metal may be manufactured very inexpensively and since the spindle is separately formed, it can be fabricated from bar stock without expensive forging operations so that each part of the bracket and spindle combination can be manufactured inexpensively and with simple manufacturing operations.

Although only one form of the invention has been illustrated and described in detail, it will be apparent to those skilled in the art that various modifications may be made without departing from the scope of the appended claims.

What is claimed is:

1. In an individual wheel springing for vehicles having an upright kingpin member and means for connecting the upper and lower ends of the member to the vehicle frame, a wheel spindle and a bracket mounting the spindle on the king pin for swinging movement about the axis of the latter, said bracket comprising sheet metal shaped to form a tubular portion receiving the king pin, and having two legs projecting from and integral with said tubular portion and jointly shaped to form a second tubular portion disposed crosswise of the first tubular portion and receiving the inner end of the spindle.

2. In an individual wheel springing for vehicles, having an upright kingpin member and means for connecting the upper and lower ends of the member to the vehicle frame, a wheel spindle, and a bracket mounting the spindle on the pin for swinging movement about the axis of the kingpin member, said bracket comprising a one piece sheet metal stamping having a tubular portion receiving the kingpin member and a tubular portion receiving the inner end of the spindle and which is fastened thereto.

3. In an individual wheel springing for vehicles, having an upright kingpin member and means for connecting the upper and lower ends of the member to the vehicle frame, a wheel spindle, and a bracket mounting the spindle on the pin for swinging movement about the axis of the kingpin member, the bracket having a tubular portion turnably receiving the kingpin member and a tubular portion receiving the inner end of the spindle, said inner end of the spindle being threaded into the latter tubular portion.

4. In an individual wheel springing for vehicles, having an upright kingpin member and means for connecting the upper and lower ends of the member to the vehicle frame, a wheel spindle, and a bracket mounting the spindle on the pin for swinging movement about the axis of the kingpin member, the bracket having a tubular portion turnably receiving the kingpin member, and a tubular portion receiving the inner end of the spindle, said inner end of the spindle having shallow, obtuse angle threads bindingly engaging the inner surface of the latter tubular portion.

5. In an individual wheel springing for vehicles, having an upright kingpin member and means for connecting the upper and lower ends of the member to the vehicle frame, a wheel spindle, and a bracket mounting the spindle on the pin for swinging movement about the axis of the kingpin member, the bracket having a tubular portion turnably receiving the kingpin member, and a tubular portion receiving the inner end of the spindle, said inner end of the spindle being threaded into the latter tubular portion and being welded thereto.

6. In an individual wheel suspension for vehicles, having an upright kingpin member and means for connecting the upper and lower ends of the member to the vehicle frame, a bracket having an upright tubular portion turnably receiving the kingpin member and also having a second tubular portion disposed at an angle to the first tubular portion, a wheel spindle having its inner end projecting into the second tubular portion and having a shoulder outwardly of the end of such portion, an apertured plate on the spindle outwardly of the shoulder and abutting the latter for holding the spindle in said second tubular portion, and means connecting the plate to the bracket.

7. In an individual wheel suspension for vehicles, having an upright kingpin member and means for connecting the upper and lower ends of the member to the vehicle frame, a bracket having an upright tubular portion turnably receiving the kingpin member and also having a second tubular portion disposed at an angle to the first tubular portion, a wheel spindle having its inner end projecting into the second tubular portion and having a shoulder outwardly of the end of such portion, and an apertured plate on the spindle outwardly of the shoulder and abutting the latter, the plate being welded to the bracket.

8. In an individual wheel suspension for vehicles, having an upright kingpin member and means for connecting the upper and lower ends of the member to the vehicle frame, a bracket having an upright tubular portion turnably receiving the kingpin member and also having a second tubular portion disposed at an angle to the first tubular portion, a wheel spindle having its inner end projecting into the second tubular portion and having a shoulder outwardly of the end of such portion, and an apertured plate on the spindle outwardly of the shoulder and abutting the latter, the plate being welded to the bracket and the end of the tubular portion being welded to the wall of the second tubular portion into which it projects.

9. In a wheel mounting, an upright kingpin member, a wheel spindle, a sheet metal bracket mounting the spindle on the kingpin member for swinging movement about the latter and comprising a sheet metal plate folded to provide an upright tubular portion turnably receiving the kingpin, and to provide legs jointly forming a second tubular portion crosswise to the first tubular portion and receiving the inner end of the spindle, said legs being in contact above and below the second tubular portion, and means securing the contacting leg portions together above and below the second tubular portion.

10. In a wheel mounting, an upright kingpin member, a wheel spindle, a sheet metal bracket mounting the spindle on the kingpin member for swinging movement about the latter and comprising a sheet metal plate folded to provide an upright tubular portion turnably receiving the kingpin, and to provide legs jointly forming a second tubular portion crosswise to the first tubular portion and receiving the inner end of the spindle, said legs being in contact above and below the second tubular portion, and being formed at their outer ends with attaching flanges directed crosswise to the axis of the second tubular portion, and means securing the contacting leg portions together above and below the second tubular portion.

11. In a wheel mounting, an upright kingpin member, a wheel spindle, a sheet metal bracket mounting the spindle on the kingpin member for swinging movement about the latter and comprising a sheet metal plate folded to provide an upright tubular portion turnably receiving the kingpin, and to provide legs jointly forming a second tubular portion crosswise to the first tubular portion and receiving the inner end of the spindle, said legs being in contact above and below the second tubular portion, and being formed at their outer ends with attaching flanges directed crosswise to the axis of the second tubular portion, means securing the contacting leg portions together above and below the second tubular portion, and a brake backing plate secured to the attaching flanges.

12. In a wheel mounting, an upright kingpin member, a wheel spindle, a sheet metal bracket for mounting the spindle on the kingpin and comprising a sheet metal plate folded to provide an upright tubular portion turnably receiving the kingpin, and to provide legs jointly forming a second tubular portion crosswise to the first tubular portion and receiving the inner end of the spindle, said legs being in contact above and below the second tubular portion and being formed at their outer ends with attaching flanges, means securing the contacting portions together above and below the second tubular portion, said spindle having a shoulder so located that it is disposed at the outer end of the second tubular portion when the spindle is in place, an apertured plate on the spindle and engaging said shoulder and being fastened to said attaching flanges, and a brake drum backing plate fastened to the attaching flanges.

13. In a wheel mounting, an upright kingpin member, a wheel spindle, a sheet metal bracket for mounting the spindle on the kingpin and comprising a sheet metal plate folded to provide an upright tubular portion turnably receiving the kingpin, and to provide legs jointly forming a second tubular portion crosswise to the first tubular portion and receiving the inner end of the spindle, said legs being in contact above and below the second tubular portion and being formed at their outer ends with attaching flanges, means securing the contacting portions together above and below the second tubular portion, said spindle having a shoulder so located that it is disposed at the outer end of the second tubular portion when the spindle is in place, an apertured plate on the spindle and engaging said shoulder and being welded to said attaching flanges, and a brake drum backing plate fastened to the attaching flanges, said spindle having its inner end welded to the wall of the second tubular portion.

14. In a wheel mounting, an upright kingpin member, a wheel spindle, a sheet metal bracket for mounting the spindle on the kingpin and comprising a sheet metal plate folded to provide an upright tubular portion turnably receiving the kingpin member and to provide legs jointly forming a second tubular portion crosswise to the first tubular portion and receiving the inner end of the spindle, said legs being in contact above and below the second tubular portion and being formed at their outer ends with attaching flanges, and means securing the contacting portions together above and below the second tubular portion, said spindle having its inner end threaded into the second tubular portion and welded to the wall of the latter.

15. A wheel spindle and knuckle bracket comprising a sheet metal plate folded to provide an upright tubular portion for turnably receiving a kingpin and to provide legs jointly forming a second tubular portion crosswise to the first tubular portion, and a wheel spindle having its inner end disposed in the second tubular portion and fastened thereto.

16. A wheel spindle and knuckle bracket comprising a sheet metal plate folded to provide an upright tubular portion for turnably receiving a kingpin and to provide legs jointly forming a second tubular portion crosswise to the first tubular portion, and a wheel spindle having its inner end threaded into the second tubular portion.

17. A wheel spindle and knuckle bracket comprising a sheet metal plate folded to provide an upright tubular portion for turnably receiving a kingpin and to provide legs jointly forming a second tubular portion crosswise to the first tubular portion, said legs above and below the second tubular portion being fastened together and the outer ends of the legs being formed to provide attaching flanges, and a wheel spindle having its inner end projecting into the second tubular portion and fastened thereto.

JOHN W. LEIGHTON.